US012564957B2

(12) United States Patent　　　(10) Patent No.:　US 12,564,957 B2

Gutierrez et al.　　　　　　　　　　(45) Date of Patent:　　　Mar. 3, 2026

(54) DYNAMIC COORDINATION OF MULTIPLE ROBOTIC MANIPULATOR ARMS

(71) Applicant: L5 Automation Inc., La Canada Flintridge, CA (US)

(72) Inventors: Alexander Gutierrez, La Canada Flintridge, CA (US); Daniel Schneider, San Jose, CA (US); Edward Terry, La Crescenta, CA (US); Bernardo Rocamora, Seattle, WA (US)

(73) Assignee: L5 AUTOMATION INC., La Cañada Flintridge (CA)

( * ) Notice: Subject to any disclaimer, the term of this patent is extended or adjusted under 35 U.S.C. 154(b) by 21 days.

(21) Appl. No.: 18/679,288

(22) Filed: May 30, 2024

(65) Prior Publication Data

US 2024/0383140 A1　　Nov. 21, 2024

Related U.S. Application Data

(63) Continuation of application No. PCT/US2024/030040, filed on May 17, 2024.

(Continued)

(51) Int. Cl.
　　　*B25J 9/16*　　　　　(2006.01)
　　　*B25J 9/00*　　　　　(2006.01)
(52) U.S. Cl.
　　　CPC ........... *B25J 9/1664* (2013.01); *B25J 9/0087* (2013.01); *B25J 9/1697* (2013.01)
(58) Field of Classification Search
　　　CPC ...... B25J 9/1664; B25J 9/0087; B25J 9/1697; B25J 9/1666
　　　See application file for complete search history.

(56) References Cited

U.S. PATENT DOCUMENTS

2021/0000013 A1 *　1/2021　Robertson ............ B25J 15/0019

FOREIGN PATENT DOCUMENTS

CN　　　114271103 A　　4/2022
WO　　2024238967 A1　11/2024
WO　　WO-2024258827 A1 *　12/2024　............. A01D 46/20

OTHER PUBLICATIONS

E. Gursoy, B. Navarro, A. Cosgun, D. Kulić and A. Cherubini, "Towards Vision-Based Dual Arm Robotic Fruit Harvesting," 2023 IEEE 19th International Conference on Automation Science and Engineering (CASE), Auckland, New Zealand, 2023, pp. 1-6. (Year: 2023).*

(Continued)

*Primary Examiner* — Robert T Nguyen
(74) *Attorney, Agent, or Firm* — Mintz, Levin, Cohn, Ferris, Glovsky and Popeo, P.C.

(57)　　　　　　　ABSTRACT

Arrangements for dynamic coordination of multiple robotic manipulator arms are provided. Image data of a real-world environment associated with a plurality of tasks to be performed in coordination by multiple robotic manipulator arms may be acquired. Objects in the image data may be identified and parametric representations thereof may be generated. A parametric model of the real-world environment may be generated using the parametric representations. Based on the parametric model, a planned trajectory of a first robotic manipulator arm over a predetermined time horizon may be determined. The first robotic manipulator arm may be controlled to execute the planned trajectory according to a first task, including manipulating a first object to reveal a second object in the real-world environment. The parametric model may be dynamically updated, and a second robotic manipulator arm may be controlled to perform a second task on the second object in coordination with the first task.

20 Claims, 17 Drawing Sheets

Related U.S. Application Data

(60) Provisional application No. 63/502,783, filed on May 17, 2023.

(56) References Cited

OTHER PUBLICATIONS

H. Luo, M. Wang, C. Wu, Y. Li, J. Li and L. Lei, "Motion Planning of Targeted Tea Leaves Harvesting by Manipulator Based on State Parsing," 2023 4th International Conference on Computer, Big Data and Artificial Intelligence (ICCBD+AI), Guiyang, China, 2023, pp. 479-484. (Year: 2023).*

Kang et al. (Mar. 31, 2020) "Visual Perception and Modeling for Autonomous Apple Harvesting", IEEE Access, 8:62151-62163.

Sepulveda et al. (Jul. 2, 2020) "Robotic Aubergine Harvesting Using Dual-Arm Manipulation", IEEE Access, 8:121889-121904.

* cited by examiner

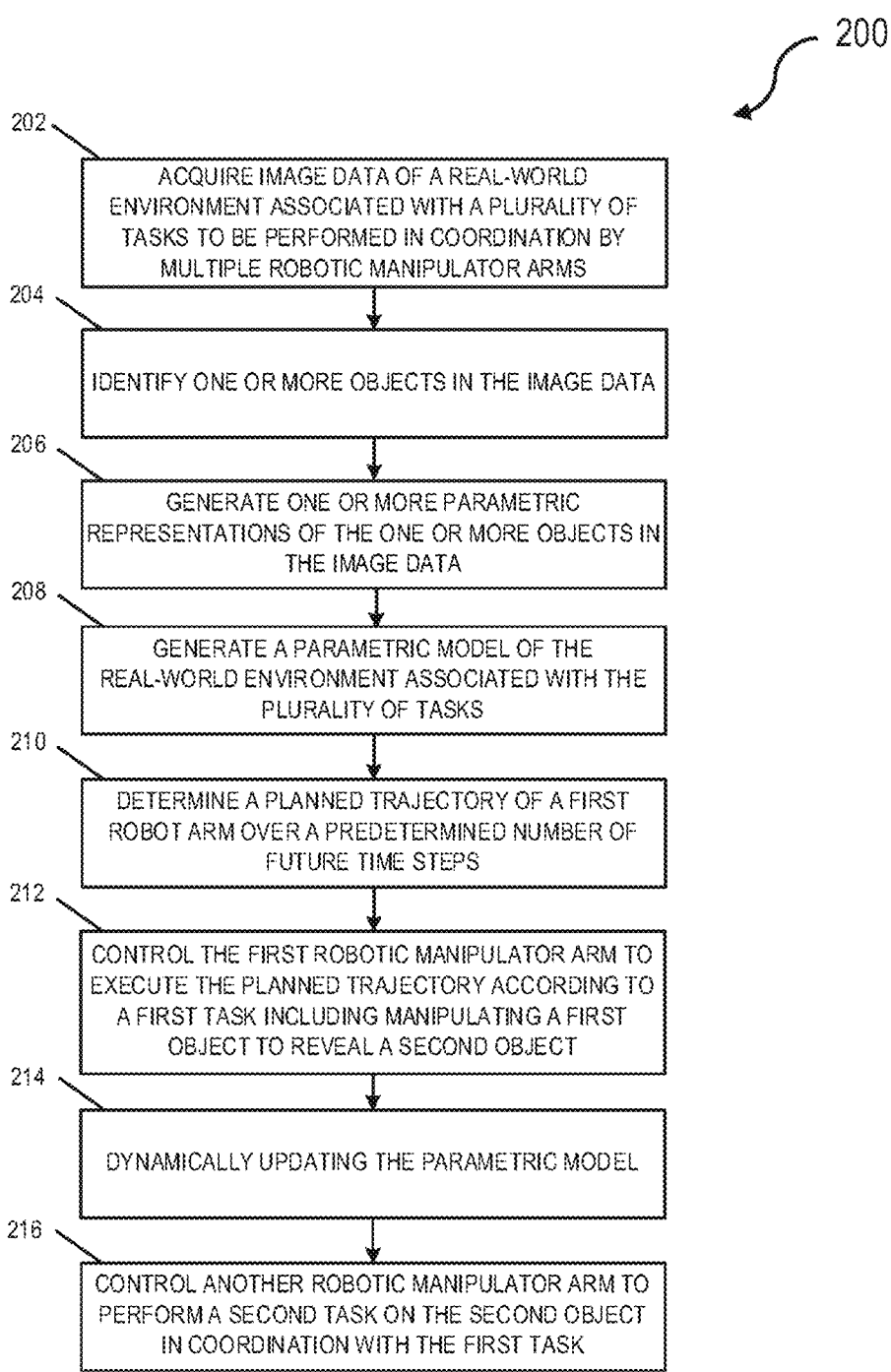

200

202
ACQUIRE IMAGE DATA OF A REAL-WORLD ENVIRONMENT ASSOCIATED WITH A PLURALITY OF TASKS TO BE PERFORMED IN COORDINATION BY MULTIPLE ROBOTIC MANIPULATOR ARMS

204
IDENTIFY ONE OR MORE OBJECTS IN THE IMAGE DATA

206
GENERATE ONE OR MORE PARAMETRIC REPRESENTATIONS OF THE ONE OR MORE OBJECTS IN THE IMAGE DATA

208
GENERATE A PARAMETRIC MODEL OF THE REAL-WORLD ENVIRONMENT ASSOCIATED WITH THE PLURALITY OF TASKS

210
DETERMINE A PLANNED TRAJECTORY OF A FIRST ROBOT ARM OVER A PREDETERMINED NUMBER OF FUTURE TIME STEPS

212
CONTROL THE FIRST ROBOTIC MANIPULATOR ARM TO EXECUTE THE PLANNED TRAJECTORY ACCORDING TO A FIRST TASK INCLUDING MANIPULATING A FIRST OBJECT TO REVEAL A SECOND OBJECT

214
DYNAMICALLY UPDATING THE PARAMETRIC MODEL

216
CONTROL ANOTHER ROBOTIC MANIPULATOR ARM TO PERFORM A SECOND TASK ON THE SECOND OBJECT IN COORDINATION WITH THE FIRST TASK

FIG. 2

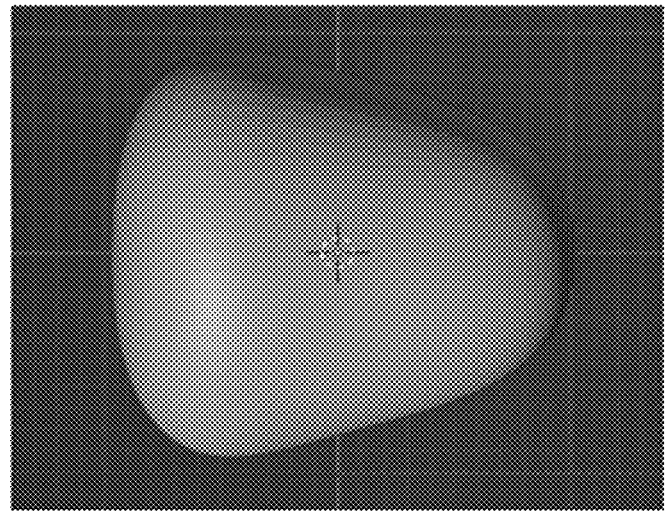
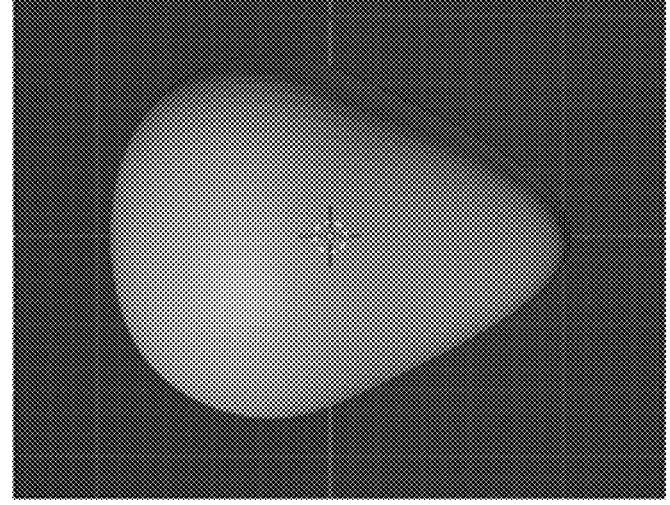
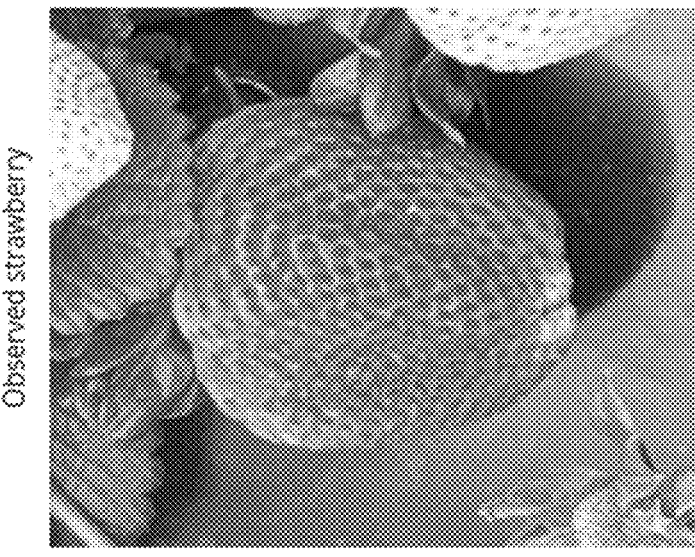
FIG. 5

FIG. 7

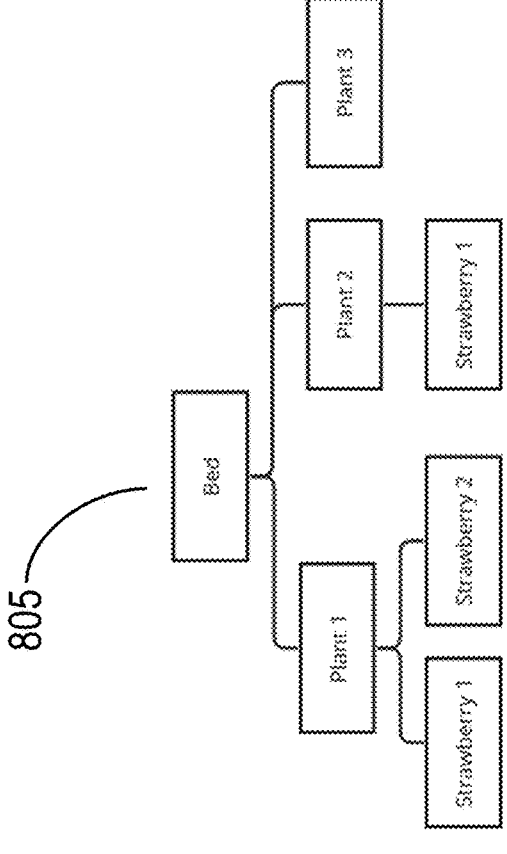
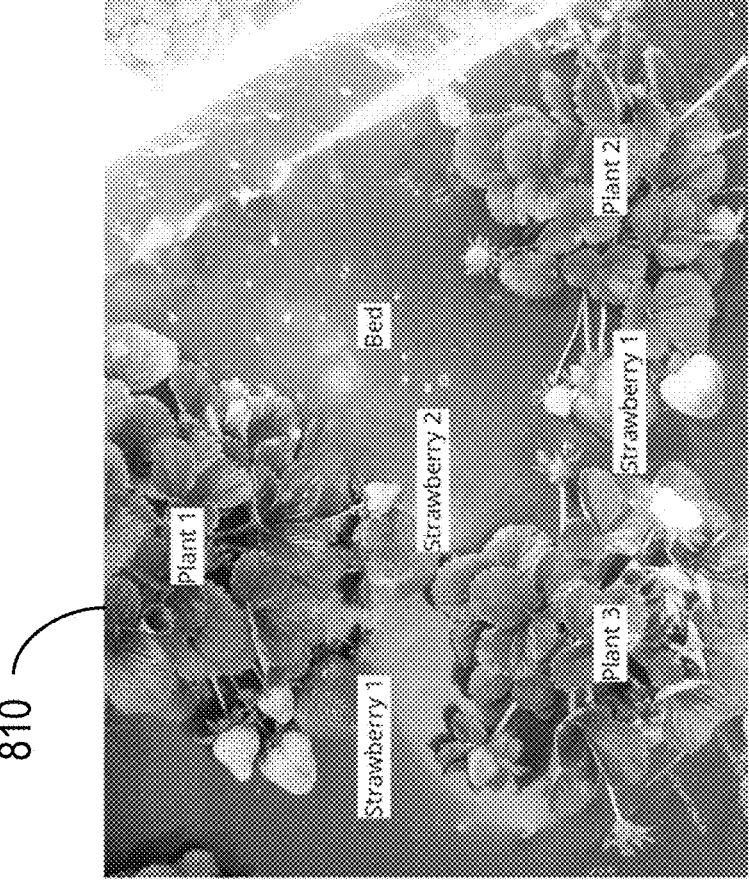
FIG. 8

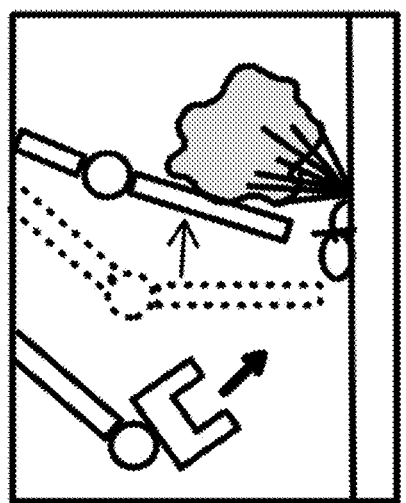
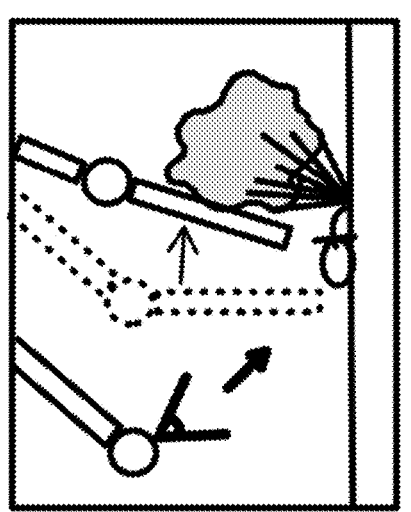
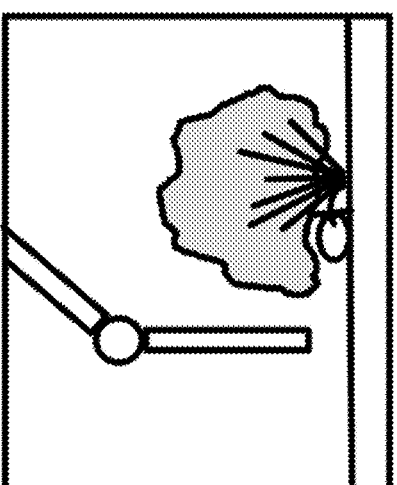
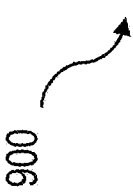
FIG. 9

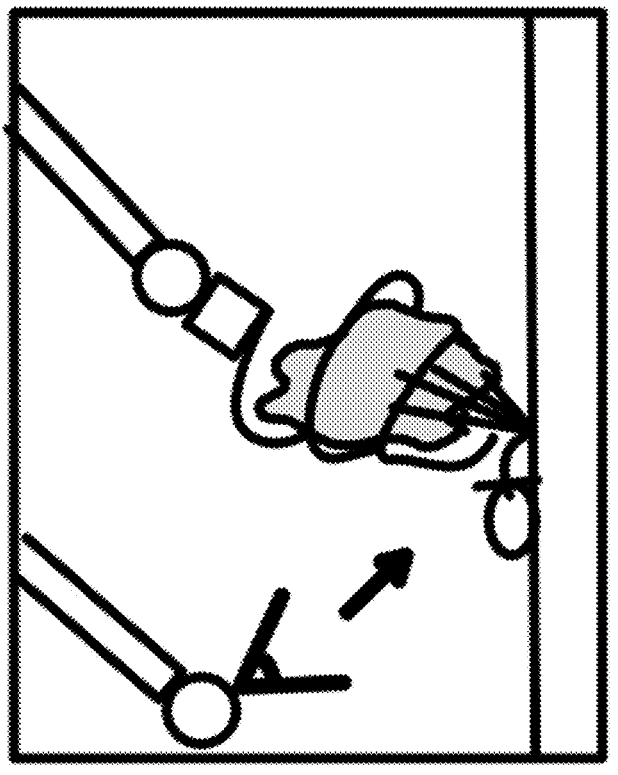
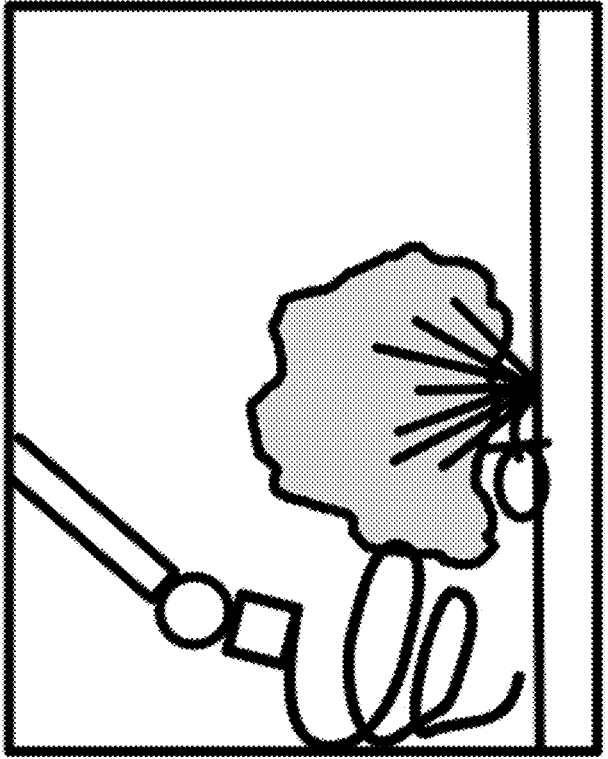
1000
FIG. 10

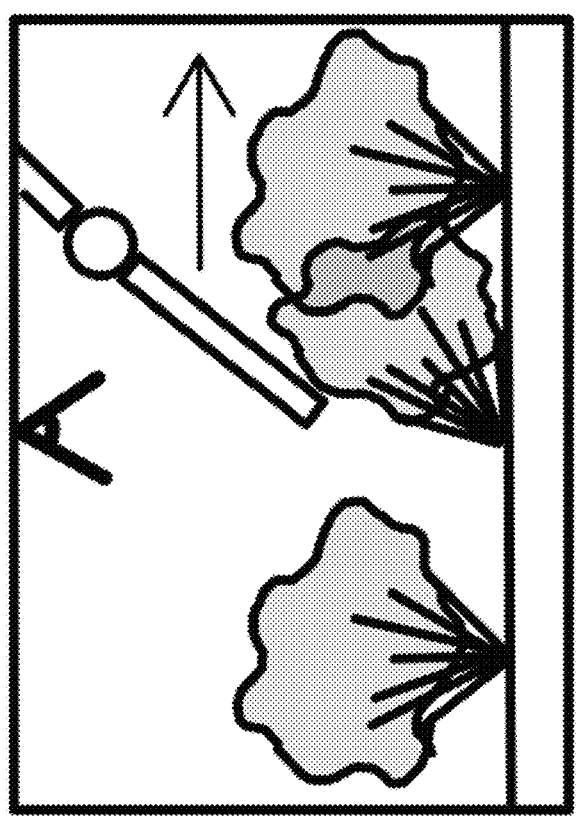
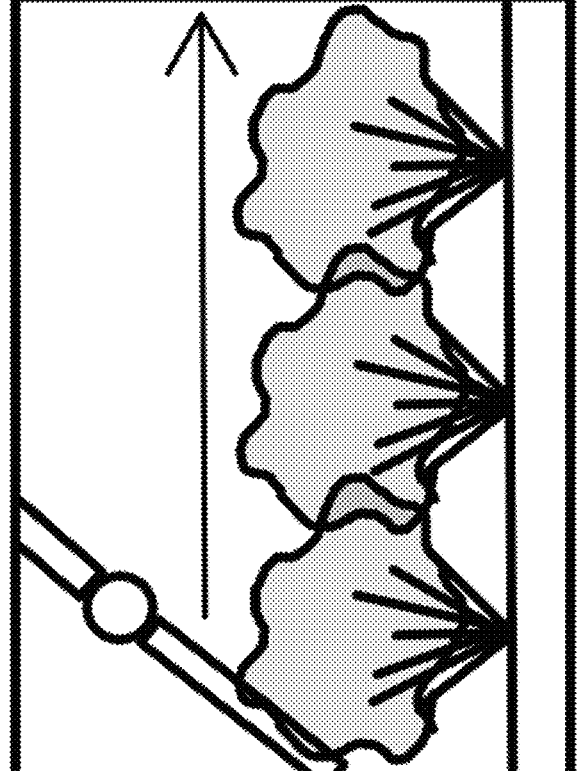
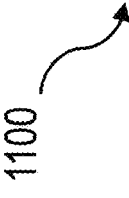
1100
FIG. 11

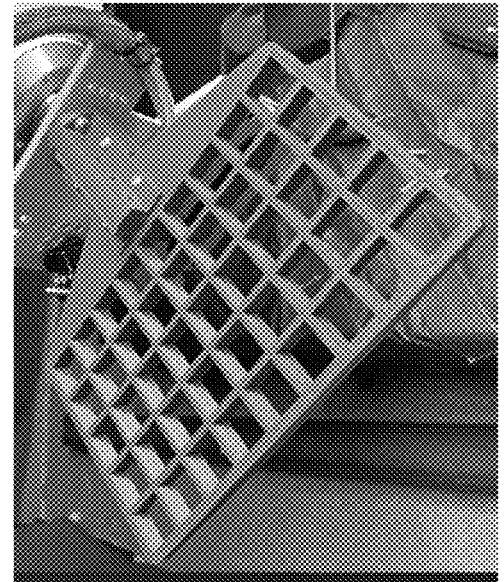
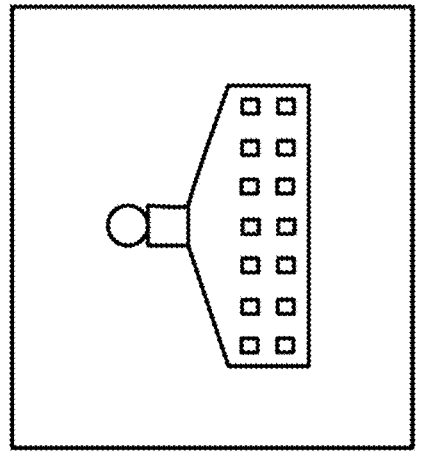
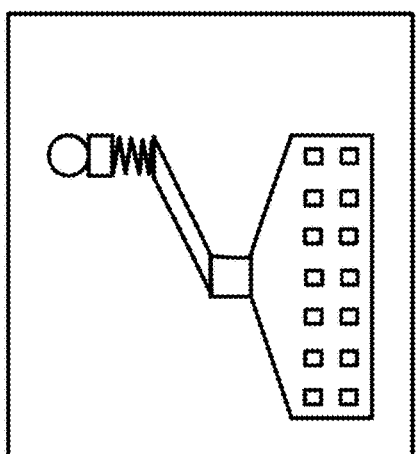
1200
FIG. 12

1300
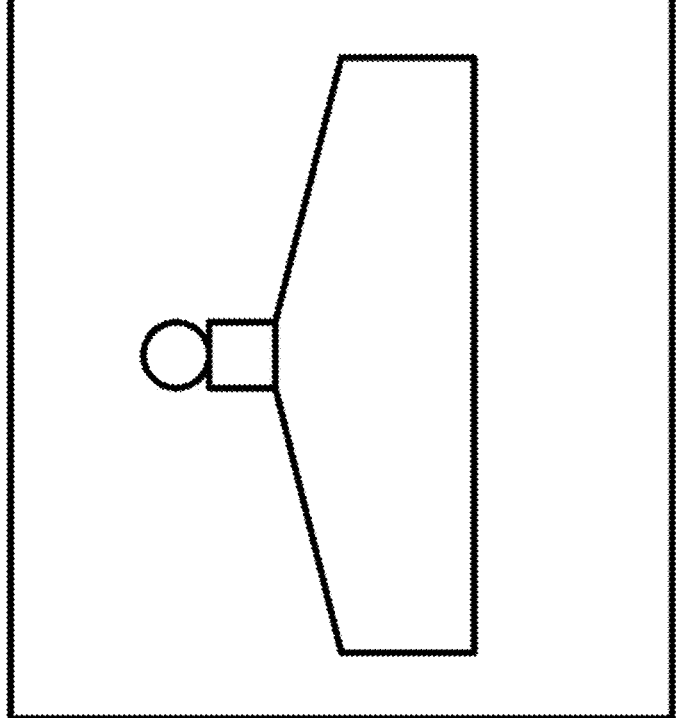
FIG. 13

1400
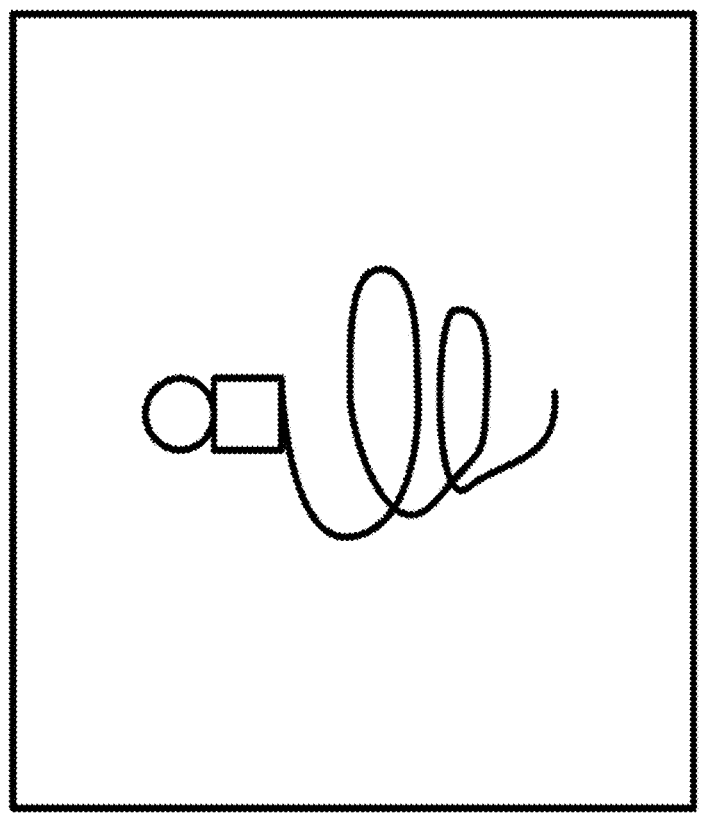
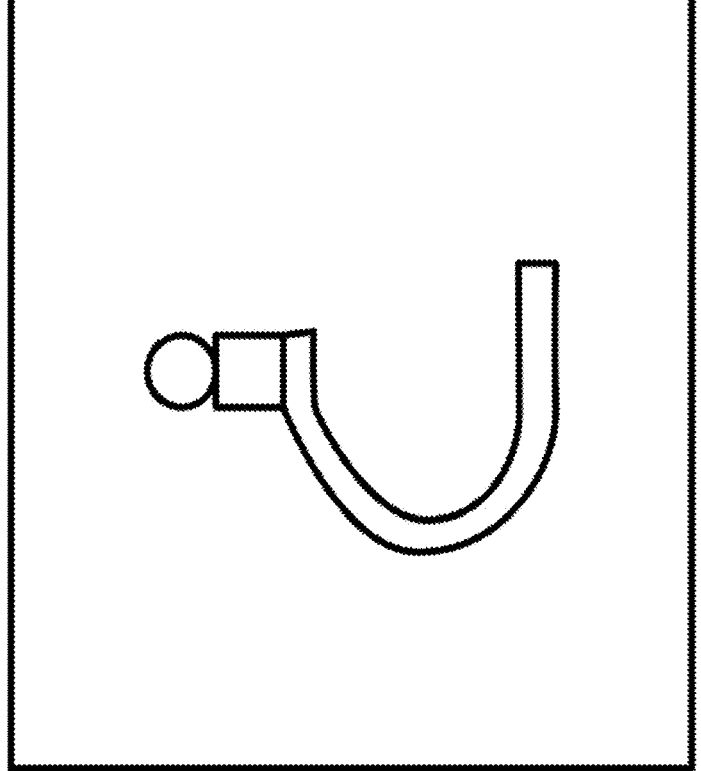
FIG. 14

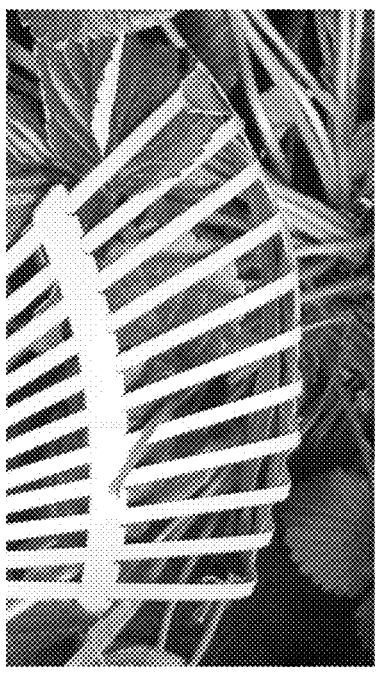
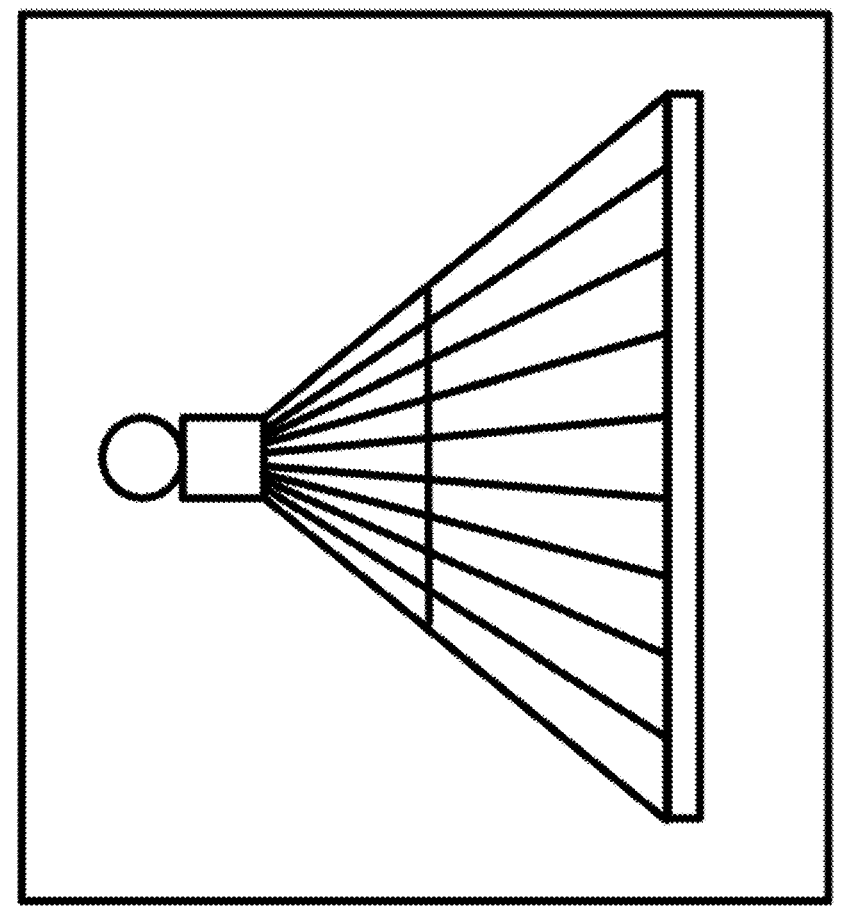
FIG. 15
1500

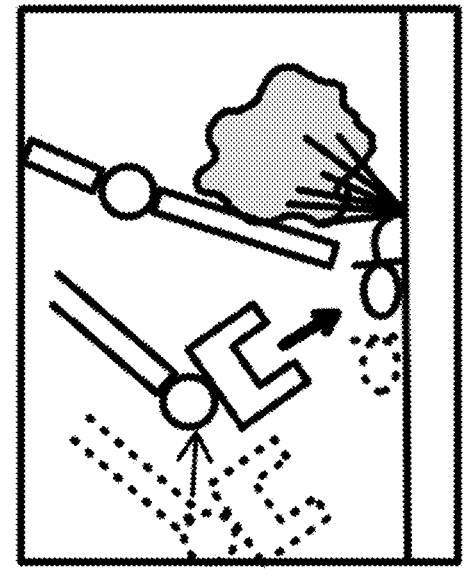
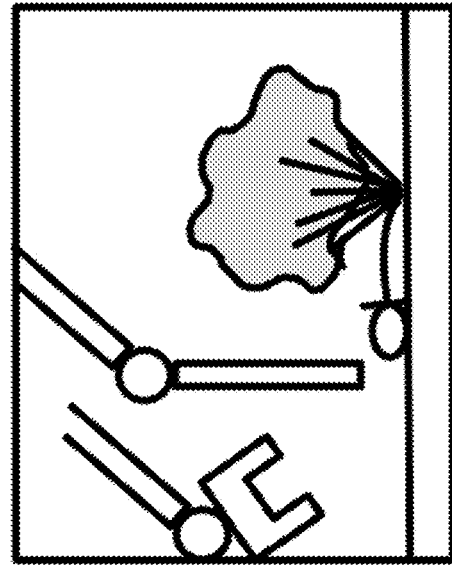
1600
FIG. 16

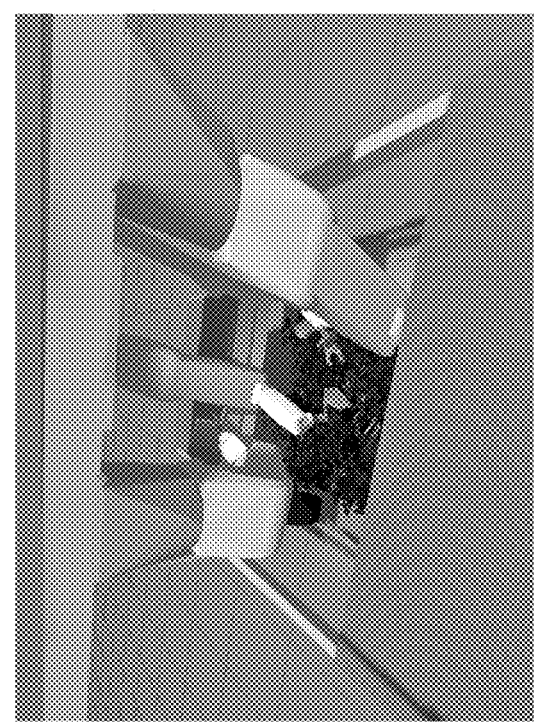
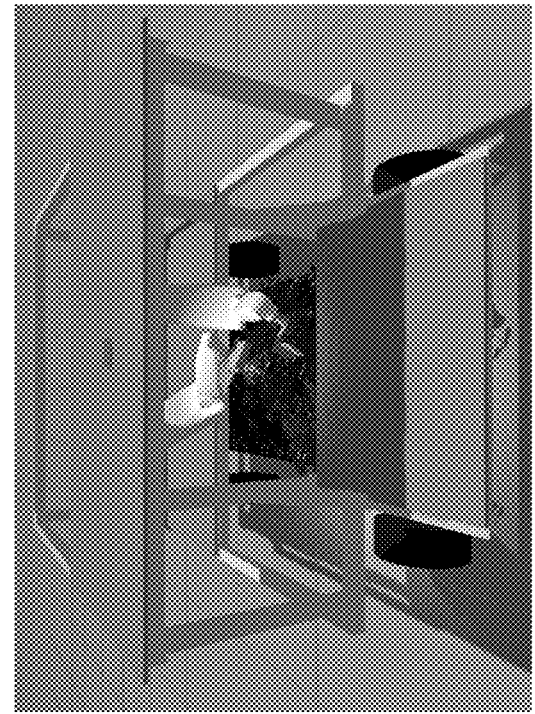
FIG. 17

DYNAMIC COORDINATION OF MULTIPLE ROBOTIC MANIPULATOR ARMS

CROSS REFERENCE TO RELATED APPLICATIONS

This application is a continuation of International Application No. PCT/US24/30040, filed on May 17, 2024, which claims the benefit of and priority to U.S. Provisional Patent Application No. 63/502,783 filed May 17, 2023, and entitled "Devices, Systems, and Methods for Multiple Robotic manipulator Arms to Collaboratively Explore, Map and Exploit Diverse Environments", the entire contents both of which are hereby expressly incorporated by reference herein.

TECHNICAL FIELD

The subject matter described herein generally relates to dynamic coordination of multiple robotic manipulator arms.

BACKGROUND

For many tasks, adding extra robotic manipulator arms can make a system more efficient. However, manipulating an object with two arms may be challenging to program on a robot, despite being performed by humans with relative ease. For example, increasing a number of robotic manipulator arms from one arm to multiple robotic manipulator arms results in an exponential increase in the computational complexity of planning for a task. Thus, planning for a high degree of redundancy at a rate that is fast enough to handle a diverse range of environments may be difficult. For example, it may be difficult to effectively implement coordination of multiple robotic manipulator arms to collaborate on tasks in a shared environment. Oftentimes, one robotic manipulator arm does not take into account another arm's dynamic manipulations.

SUMMARY

The current subject matter includes implementing with low latency dynamic coordination of multiple robotic manipulator arms for discovering, exploring, and manipulating objects within an environment. In an aspect, a method includes acquiring, from a perspective of a robotic device, image data of a real-world environment associated with a plurality of tasks to be performed in coordination by at least a first robotic manipulator arm and a second robotic manipulator arm of the robotic device; identifying one or more objects in the image data; generating one or more parametric representations of the one or more objects in the image data; generating, using the one or more parametric representations, a parametric model of the real-world environment associated with the plurality of tasks, wherein the parametric model includes a three-dimensional volumetric grid composed of voxels, and wherein each voxel is assigned with a low-dimensional representation of a state of a portion of the real-world environment and semantic information associated with the one or more objects; based on the parametric model, determining a planned trajectory of the first robotic manipulator arm over a predetermined number of time steps, including identifying whether an obstacle will intersect with the planned trajectory of the first robotic manipulator arm within the predetermined number of time steps; controlling the first robotic manipulator arm to execute the planned trajectory according to a first task of the plurality of tasks including manipulating a first object of the one or more objects to reveal a second object in the real-world environment; dynamically updating the parametric model of the real-world environment associated with the plurality of tasks; and controlling, based on the updated parametric model, the second robotic manipulator arm to perform a second task of the plurality of tasks on the second object, wherein the second task is performed in coordination with the first task.

One or more of the following features can be included in any feasible combination. In some variations, dynamically updating the parametric model of the real-world environment associated with the plurality of tasks may include determining a planned trajectory of the second robotic manipulator arm over a predetermined number of time steps.

In some variations, parameterizing the image data may include transforming pixel data of the one or more objects into compressed representations of the one or more objects.

In some variations, the second object may include an object that is at least partially occluded by the first object.

In some variations, the first object may include at least a portion of the second robotic manipulator arm.

In some variations, the image data may be acquired using an image sensor on the robotic device.

In some variations, dynamically updating the parametric model of the real-world environment associated with the plurality of tasks may include updating to include additional objects identified by an image sensor on the robotic device and parameterized.

In some variations, manipulating the first object of the one or more objects may include volumetrically deforming or displacing the first object.

In some variations, the predetermined number of time steps may be three or less future time steps.

In some variations, the planned trajectory of the first robotic manipulator arm may be selected from a set of candidate trajectories for the first robotic manipulator arm. In addition, each candidate trajectory of the set of candidate trajectories may include a series of planned states for the first robotic manipulator arm occurring within the predetermined number of time steps.

In some variations, dynamically updating the parametric model of the real-world environment associated with the plurality of tasks may include cyclically updating in a round-robin manner for each additional robotic manipulator arm used for performing one of the plurality of tasks.

In some variations, the first robotic manipulator arm may include an end-effector operatively coupled to a distal end of the first robotic manipulator arm for performing the first task on the first object. In addition, the end-effector may include a flexible paddle.

In some variations, the second robotic manipulator arm may include an end-effector operatively coupled to a distal end of the second robotic manipulator arm for performing the second task on the second object. In addition, the end-effector may include an object grasper.

In some variations, the real-world environment may be an outdoor environment.

In some variations, the controlling of the first robotic manipulator arm and the controlling of the second robotic manipulator arm may occur without user interaction.

In another aspect, there is provided an apparatus including a plurality of robotic manipulator arms, one or more image sensors, a processor, and a memory. The memory can store instructions that cause operations when executed by the at least one processor. The operations may include: acquiring, from the one or more image sensors, image data of a real-world environment associated with a plurality of tasks to be performed in coordination by at least a first robotic manipulator arm and a second robotic manipulator arm of the plurality of robotic manipulator arms; identifying one or more objects in the image data; generating one or more parametric representations of the one or more objects in the image data; generating, using the one or more parametric representations, a parametric model of the real-world environment associated with the plurality of tasks, wherein the parametric model includes a three-dimensional volumetric grid composed of voxels, and wherein each voxel is assigned with a low-dimensional representation of a state of a portion of the real-world environment and semantic information associated with the one or more objects; based on the parametric model, determining a planned trajectory of the first robotic manipulator arm over a predetermined number of time steps, including identifying whether an obstacle will intersect with the planned trajectory of the first robotic manipulator arm within the predetermined number of time steps; controlling the first robotic manipulator arm to execute the planned trajectory according to a first task of the plurality of tasks including manipulating a first object of the one or more objects to reveal a second object in the real-world environment; dynamically updating the parametric model of the real-world environment associated with the plurality of tasks; and controlling, based on the updated parametric model, the second robotic manipulator arm to perform a second task of the plurality of tasks on the second object, wherein the second task is performed in coordination with the first task.

In some variations, one or more of the features disclosed herein including the following features can optionally be included in any feasible combination. In some variations, the first robotic manipulator arm may include an end-effector operatively coupled to a distal end of the first robotic manipulator arm for performing the first task on the first object. In addition, the end-effector may include a rigid or a flexible paddle.

Non-transitory computer program products (i.e., physically embodied computer program products) are also described that store instructions, which when executed by one or more data processors of one or more computing systems, causes at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

FIG. 2 is a flow diagram illustrating an example embodiment of a process for dynamic coordination of multiple robotic manipulator arms in accordance with some example embodiments.

FIG. 5 illustrates example parametric representations for an observed strawberry in accordance with some example embodiments.

FIG. 7 illustrates an example scene before and after interaction with the scene according to some embodiments disclosed herein.

FIG. 8 illustrates an example hierarchical semantic model of a typical scene according to some embodiments disclosed herein.

FIGS. 9-11 depict example classes of non-prehensile motion primitives for interacting with strawberry plants, according to some embodiments disclosed herein.

FIGS. 12-15 depict example variants of end-effectors which may be deployed for foliage manipulation, according to some embodiments disclosed herein.

FIG. 16 illustrates how some implementations of the current subject matter can allow for dynamic replanning caused by unpredictable changes in the scene in accordance with some example embodiments.

FIG. 17 depicts example configurations for a multi-arm harvester robot in accordance with some example embodiments.

Like reference symbols in the various drawings indicate like elements.

DETAILED DESCRIPTION

Figure 1:
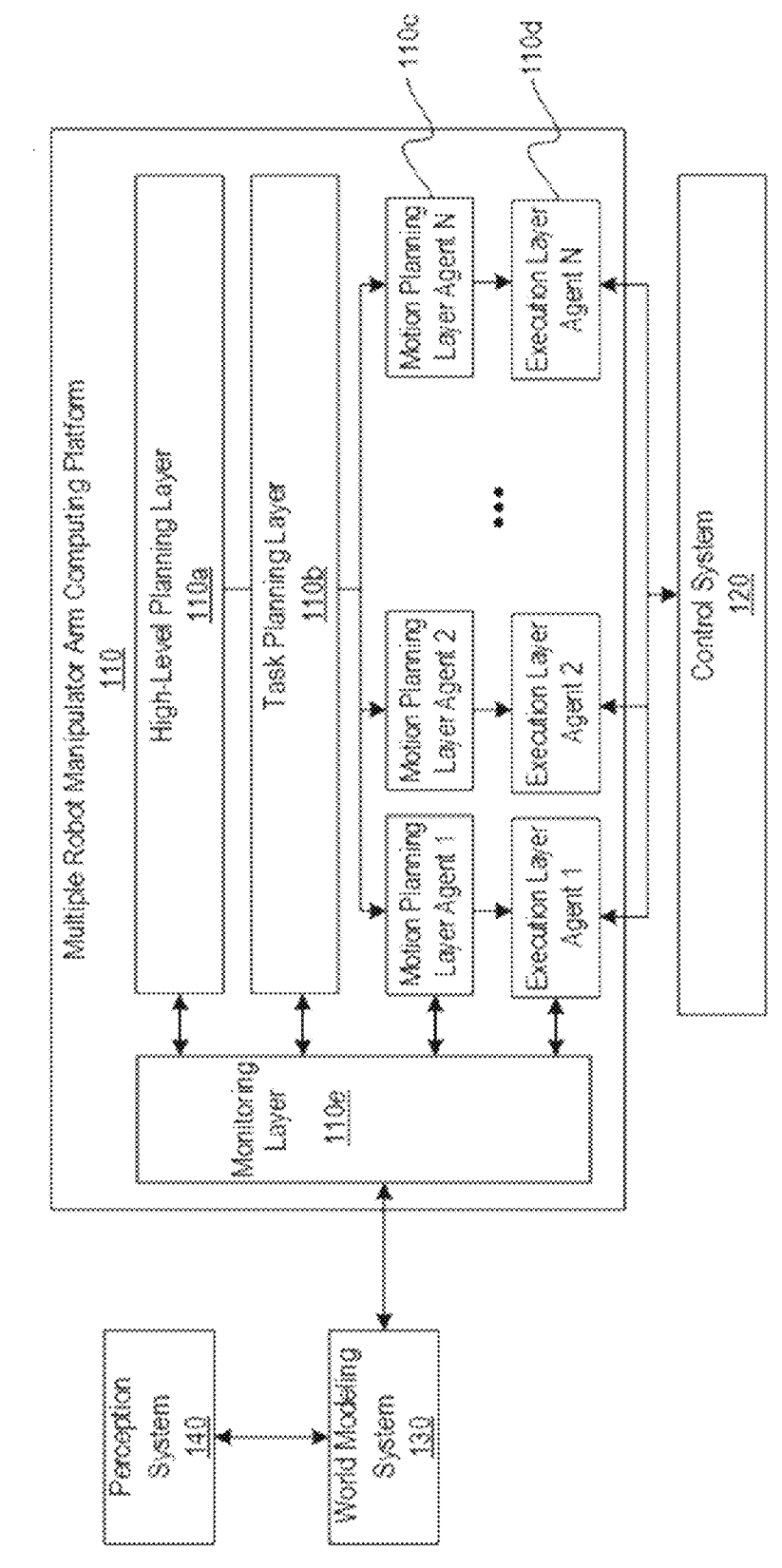
FIG. 1 illustrates a computing environment for dynamic coordination of multiple robotic manipulator arms in accordance with some example embodiments.

Aspects of the disclosure provide one or more technical solutions for addressing problems associated with dynamic coordination of multiple robotic manipulator arms. The multiple robotic manipulator arms can include, for example, arms with N-degrees of freedom (N-DOF arms) or delta robots. Additional aspects of the disclosure provide a multiple arm robotic planning and control platform that uses real-time predictions obtained from parametric representations to plan and act on a world at a rate that is fast enough to handle a diverse range of environments, particularly unstructured, unorganized, wide-open, cluttered, and/or dynamic environments. Further aspects of the disclosure provide a multiple manipulator arm arrangement whose coordinated interaction based on cooperative exploration and mapping of a scene increases the affordances available to each individual robotic manipulator arm. Still further aspects of the disclosure provide multiple robotic manipulator arms with the ability to perceive and react in real-time to changes in an environment, enabling the multiple manipulator arms to collaboratively work in overlapping workspaces.

Some implementations of the current subject matter can include a multiple manipulator arm system whose coordinated interaction based on cooperative exploration and mapping of an unstructured scene increases the affordances available to each individual actor. One example implementation can include agricultural settings, including strawberry harvesting, but the current subject matter can extend to other applications. In harvesting applications, it can be desirable to achieve maximum harvesting rates (e.g., number of picks per minute). This can create a requirement for high-speed motion of the manipulator arms and for the ability to perceive and react in real-time to changes in the environment. Some implementations of the current subject matter can include multiple complementary elements that solve this problem, the techniques as described herein including a lightweight and expressive world model and estimation representation, approaches and designs for scene interaction, and low-latency multi-robot planning architecture and methods.

With respect to the lightweight and expressive world model, and associated estimation representation and method, some implementations of the current subject matter can include using a world modeling technique that compresses observations from an array of heterogeneous cameras (e.g., heterogenous in location, resolution, spectrum, and mobility) into a lightweight, hierarchical, and semantic representation. This can be accompanied by state estimation techniques that exploit prior knowledge about the geometric and/or phenotypical characteristics of scene elements to improve stability of pose estimates of scene objects in occlusion and limited views.

With respect to scene interaction methods and designs, some implementations of the current subject matter can include using end-effector designs and their respective manipulation motion primitives for a single manipulator arm to actively change the state of a scene. Some implementations can include an algorithm for multiple manipulator arms to exploit the affordances provided by scene interactions to detect and localize previously occluded objects of interest.

With respect to low-latency multi-robot planning architecture and methods, some implementations of the current subject matter can include a full multi-arm robotic planning and control system that uses the above-described models to plan and act on the world at a rate that is fast enough to handle unstructured, unorganized, wide-open, cluttered, and/or dynamic environments. A high-level scheduler may change or swap roles allocated to physical actors in the system such that the actors are not bound to their nominal roles. For example, the end-effectors are not constrained to a specific role and can be repurposed or swapped as needed based on their currently assigned task. In some implementations, non-prehensile movements may be used to interact with the environment. For example, instead of or in addition to an end-effector, a forearm of a robotic manipulator arm may be used to interact with the environment (e.g., to sweep aside foliage).

Some implementations of the current subject matter utilize the lightweight and expressive world modeling to speed up the reasoning of the robot as related to its surrounding environment. The modeling techniques as described herein can use scene interaction techniques, as described below, to change the state of the scene to facilitate the overall task attributed to the robot. Furthermore, some implementations of the current subject matter can utilize low-latency multi-robot planning to actively deform the environment leading to potentially unintended and unpredictable changes. In this dynamic environment, the behavior of the arms can be adapted when changes occur, and their interaction can be solved in real-time. This can create a requirement for high-speed motion of the manipulator arms and for the ability to perceive and react in real-time to changes in the environment. In other approaches, this can be done by, for example, considering either a non-changing environment and planning for both arms jointly or by moving each of the arms sequentially and considering them as obstacles to each other.

Many tasks are hard, or impossible, to be executed with a single agent (robotic manipulator arm) because a single robotic arm is limited in its capabilities. An example of such situations include situations where extra arms need to interact with foliage to improve the image acquisition system visibility and/or the picking arm reachability. Some implementations of the current subject matter can add a helper arm to the system. For some tasks, adding one or more extra robotic manipulator arms can make the system more efficient. An example of such an implementation is using the situation described above, when the picking arm is busy moving strawberries to a harvesting bin, the helper arm is idle. More picking arms can be added to improve the efficiency of the system by reducing idleness of, for example, the helper arm. In addition, as more arms are added, more cameras can be made available to collect images from different viewpoints and angles, enabling the construction of higher quality maps.

When multiple robotic manipulator arms are positioned and configured to be coordinated and share the same workspace, their motions can account for spatial and temporal dimensions to provide a safe operation. An example of such multiple manipulator arm system is a fruit harvester robot. The harvester can include a harvesting cell with multiple robotic manipulator arms. The example robotic harvester can also include a perception system, a world modeling system, a control system, and a planning system.

FIG. 17 depicts example configurations for a multi-arm harvester robot. On the left is an example harvesting cell with two robotic manipulator arms (e.g., one for picking and one for helping). On the right is an example harvesting cell with three robotic manipulator arms (e.g., two for picking and one for helping). More specifically, the configuration on the right shows an instance where a first picking arm is being helped by a helper arm while a second picking arm delivers some fruit to a shelf.

One example configuration can include two or more arms as with defined roles. In a case with two arms, the first arm can be tasked with picking fruits and the remaining arm can be tasked with helping the picking arm by pushing the foliage aside, improving visibility and reachability. Another example configuration can use two or more multipurpose arms. In a case with two multipurpose arms, both have the capacity of pushing the foliage and picking fruits.

Robotic manipulator arms can interact and change the state of the environment. Examples of prehensile manipulation include, but are not limited to, picking and moving fruits and grasping and moving stems. Examples of non-prehensile manipulation include, but are not limited to, moving foliage and reorganizing foliage. Other examples of interaction include cutting stems.

In certain implementations, there can be frequent interactions between perception tasks (e.g., image acquisition, state estimation) and scene interaction (e.g., moving foliage, deformable obstacles, and other movable objects for better views or pick access). This interaction can play out at different spatial scales. As an example, upon arrival at a new segment of plant bed ready for harvesting, the example harvester robot can conduct a high-level survey to evaluate the most promising regions to explore. In the process of visiting each region, it may detect more target objects, at which time it plans and executes a more detailed refinement scan, reducing error bounds on the pose estimate sufficient to trigger a specific action to exploit the environment (e.g., a pick attempt in the case of strawberries). This process can be executed iteratively until all regions have been visited.

FIG. 1 illustrates a computing environment 100 for dynamic coordination of multiple robotic manipulator arms in accordance with some example embodiments. Referring to FIG. 1, the computing environment 100 may include one or more computing devices and/or other computing systems. For example, computing environment 100 may include a multiple robotic manipulator arm computing platform 110, a control system 120, a world modeling system 130, and a perception system 140. Multiple robotic manipulator arm computing platform 110 may include one or more computing layers configured to perform one or more of the functions described herein. Control system 120 may regulate and command the functions of a robotic device in order to achieve a desired objective. World modeling system 130 may include an end-to-end model for a specific problem domain. The world modeling system 130 may enable predictions to be made about what will happen in the real world as a result of certain actions. Perception system 140 may include image sensors or the like that enable a robotic device to collect and process data about its environment.

More specifically, multiple robotic manipulator arm computing platform 110 (hereinafter "computing platform 110") may include a high-level (resource) planning layer 110a, a task planning layer 110b, a motion planning layer 110c, an execution layer 110d, and a monitoring layer 110e.

In the high-level planning layer 110a, based on a current understanding of the world, the computing platform 110 can compute a predetermined number of time steps ahead in advance of the steps or sequence the robot needs to execute to achieve a particular goal (e.g., business-level goals). In turn, the computing platform 110 can decide which actions should be taken and by which agent (e.g., robotic arm). In an example involving fruit picking, the high-level planning layer 110a may decide that one arm would be allocated to pick and the other to interact with the environment. Examples of a resource allocation process may include: tasking an arm with picking fruits that are reachable and pickable, tasking an arm with exploring the scene if it has not been explored yet and searching for fruits, or tasking an arm with repositioning clustered fruits or moving plant foliage. Such tasks may be selected for planning based on a value function that estimates how to make more use of available resources in a planning timeframe.

In the task planning layer 110b, the computing platform 110 can define a sequence of motion primitives to be executed by each agent (e.g. robotic manipulator arm). These motion primitives can be defined for each role that the arms can potentially have, and can include traditional primitives as well as custom, application-specific primitives. Additionally, coordination can be defined at a task level instead of motion planning level, making it is possible to plan for both arms separately. This decentralization can enable the use of multiple manipulator arms without increasing planning time.

In turn, tasks can be defined for each robotic manipulator arm. Among other examples, tasks may include moving to certain positions, pushing foliage, and picking fruits. Examples of the custom application-specific primitives include, but are not limited to:

Picking: a sequence of motions that cause an effector, such as a gripper, of a robotic manipulator arm, to reach a fruit and appropriately detach it from its plant. For strawberries, this can be done by swiftly rotating the end-effector or by "snapping" it from of its stem;

Grazing: a sequence of motions that cause another effector, such as a gripper of a robotic manipulator arm that is gripping a paddle, to move relative to or along the canopy of the foliage in broad motions to expose plant centers underneath (e.g., to help disambiguate individual plants when the centers are occluded by the canopy by exposing the centers sequentially);

Pushing foliage: a sequence of motions that cause another effector, such as a gripper of a robotic manipulator arm that is gripping a paddle, to move the foliage aside to expose the region which would be normally covered by a canopy (e.g., pushing a plant to the side and opening space for exploring with cameras and picking); and Snipping: a sequence of motion that cause another effector, such as a gripper of a robotic manipulator arm that is gripping a scalpel or other sharp instrument, to cut stems or runner plants.

In the motion planning layer 110c, the computing platform 110 can determine the motions that need to be executed by the agents in a decentralized, per agent, manner. The motion and dynamics of other agents during a time window can also be determined. This is especially useful in a changing environment as described above. Aspects of the disclosure considers, in a round-robin style, a solution in which the motion of each arm can be planned in a decoupled manner. During the execution of the motion of an arm, the system can dynamically plan and adapt its behavior, triggered by changes in the environment which are monitored in real-time. The tasks for each robotic manipulator arm can be converted into start and goal configurations and motion plans are calculated for each of the arms, respectively. Thereby, the system can handle many types of dynamic events.

Examples of reactive motion planning may include adaptations to the motion plan of a robotic manipulator arm due to: deformable or malleable objects appearing in the planned motion path of the arm motion, deformable or malleable objects requiring changes to one or more goals for the motion plan, moving parts or deformable parts appearing in the path of the arm motion, obstacles appearing in the planned motion path of the arm motion, or changing environmental conditions.

In the execution layer 110d, the computing platform can control each of the robotic manipulator arms and causes the motion plan for each to be executed.

In the monitoring layer 110e, with the models being processed and updated at control system speeds and using a monitoring agent that monitors the execution of the tasks, replanning can be performed at every time step in case of changing scene. For example, the discovery of new strawberries during a pushing foliage task can trigger a picking task to be assigned to an arm to move and pick the strawberries or, if the strawberries are still partially occluded, a path of a foliage interaction arm can be reactively modified to allow the strawberry to be picked. Therefore, by modelling and understanding the scene at the sensing rate, the motion of the arms can be reactive to these changes.

An example of such scenario is as follows: a strawberry is located by a perception system (e.g., perception system 140) of a harvester, but it is partially occluded by the foliage around it. An initial parametric model of the strawberry (a low-level representation as further described herein) is recorded by the system. The system identifies the need to push foliage aside to better visualize and locate the strawberry. A helper arm is tasked with interacting with the foliage using an action that can be prehensile (e.g., picking and moving fruits, grasping and moving stems) or non-prehensile (e.g., moving foliage, reorganizing foliage). Other example interactions may include cutting stems. A picking arm is tasked with following the helper arm to localize and pick the strawberry as soon as possible. As the helper arm deforms the plant, the strawberry is indirectly affected and moved. The system is able to update the strawberry bed model in real-time. Based upon the rate of perception and execution, the computing platform is able to adapt the motion of the helper arm and the picking arm to avoid a collision and open space for its pick.

World modeling system 130 can stabilize pose estimates of scene objects by allocating them in a hierarchical manner. As opposed to naïve detections where each element is considered in isolation, taking a hierarchical approach can allow relative parent-child and sibling estimates to improve the consistency of the estimate of the entire scene. Such representations can be highly compressed and therefore efficient to query and update. FIG. 8 illustrates an example hierarchical semantic model 805 of a typical scene 810.

Mapping may be performed by multiple cameras having potentially different resolutions, mounting locations (fixed, moving), spectra, and the like. By applying prior knowledge about objects which are expected to be encountered in the scene, more reliable and rapid estimation of their salient attributes can be achieved. In the case of harvesting strawberries, the salient attributes can include: position and orientation, ripeness, and other phenotypical characteristics such as the shape of its tip. As such, the example harvester can adapt the target grasping pose to the specific geometry of each strawberry. In the specific case of strawberry harvesting, the average strawberry often has the form of an elongated rounded cone. When a strawberry is detected with a convolutional neural network located in the world modeling system (e.g., world modeling system 130), a canonical model in a three-dimensional model of the world at the estimated pose can be determined. The example world modeling system of the example harvester can use a combination of semantic keypoints, contours and textures to update the key parameters, including length, width, location of max width and the tip curvature associated with the target strawberry. Even if the strawberry is partially occluded, the example harvester can still make use of the visible portion of the strawberry to update its estimates, knowing that the occluded portion likely has a consistent structure. As for plants, they can be typically planted in a regular staggered grid, a fact which can be exploited when estimating their observed locations. In both cases, the example world modeling system can perform estimation of instance-specific values for parametric representations through the training and detection of semantic keypoints.

FIG. 2 is a flow diagram illustrating an example embodiment of a process 200 for dynamic coordination of multiple robotic manipulator arms.

Referring to FIG. 2, at step 202, the computing platform 110 may acquire, from a perspective of a robotic device, image data of a real-world (e.g., physical) environment associated with a plurality of tasks to be performed in coordination by at least a first robotic manipulator arm and a second robotic manipulator arm of the robotic device. For example, an image sensor may be mounted on a frame or a manipulator arm of the robotic device to acquire image data of the environment, such as a scene or workplace.

In some example embodiments, the first robotic manipulator arm may include an end-effector operatively coupled to a distal end of the first robotic manipulator arm for performing the first task on the first object. The second robotic manipulator arm may include the same or a differently typed end-effector operatively coupled to a distal end of the second robotic manipulator arm for performing the second task on the second object. Example end-effectors include a rigid or flexible paddle (e.g., a waffle grid paddle, a solid plate, a rake), an object grasper (e.g., a hook, a corkscrew, a gripper), and/or the like.

The environment may include a diverse range of environments including indoor environments as well as outdoor environments such as an agricultural environment or other complex organic environment, a construction site, a mining site, asteroids, a lunar landing site, and/or the like.

At step 204, the computing platform 110 may identify one or more objects in the image data. At step 206, the computing platform 110 may generate one or more parametric representations of the one or more identified objects (e.g., of the world, objects of interest, and/or robotic manipulator arms). Parameterizing the image data may include transforming pixel data of the one or more objects into compressed representations of the one or more objects (e.g., parameterizing out, to a desired degree, the key features for planning associated with the robotic manipulator arms). Instance-specific values for the parametric representations may be estimated through training and detection of semantic keypoints and key features.

In this respect, FIG. 5 illustrates an example of simplified model building including an observed strawberry and corresponding parametric representations (e.g., conical model or deformed fitted model). In one example, the computing platform 110 would identify a strawberry in a scene and determine, a radius, length, cone, or other aspects associated with the strawberry. A low-level representation would be stored (e.g., with a low number of bytes, such as 8 bytes, rather than each individual vertex in the three-dimensional model being represented). These simplified models makes it computationally cheaper (e.g., reducing processing and compute time) to execute planning for any particular robotic manipulator arm and provide for high update rates (e.g., 25 hertz or faster, such that the planning for each robotic manipulator arm is effectively simultaneous for the multiple robotic manipulator arms). This reduction in complexity to a simplified state of an object may be performed for every key feature or object in the environment.

Returning back to FIG. 2, at step 208, the computing platform 110 may generate, using the one or more parametric representations, a parametric model of the real-world environment (e.g., a parametric world model) associated with the plurality of tasks. The parametric model may be dynamically updated. The parametric model can include a three-dimensional volumetric grid of voxels (the minimum unit being a voxel). In addition, each voxel may be assigned with a low-dimensional representation of a state of a portion (e.g., an occupancy state) or location of the real-world environment, as well as semantic information associated with the one or more objects (e.g., occupancy, deformability, geometry, and dynamic properties such as velocity and acceleration, associated with the one or more objects). For example, the three-dimensional volumetric grid may represent the level of visibility of a region of interest, ranging from highly occluded sectors which have high potential to reveal an occluded target object to occluded target sectors where visibility is adequate (sufficiently adequate to determine a target of interest is not present). In addition, each of the plurality of grid cells may be assigned with semantic information associated with the one or more objects (e.g., if it is a plant, if it is deformable, etc.). This information may be projected into the future (e.g., "N" time steps ahead from a current time). The parametric model may be used to assist with estimating the next best scene interaction (e.g., most promising regions to explore to reach a target objective) by the computing platform 110. Alternatively, the parametric model can include octree-based representations that enable variable three-dimensional volume representations.

The parametric model of the world may include information about the elasticity and plasticity of the objects present in the environment and the forces and torques that would be necessary to deform or displace them. A parametric model with this information can be used to specify requirements and constraints for the robot planning system.

Figure 6:
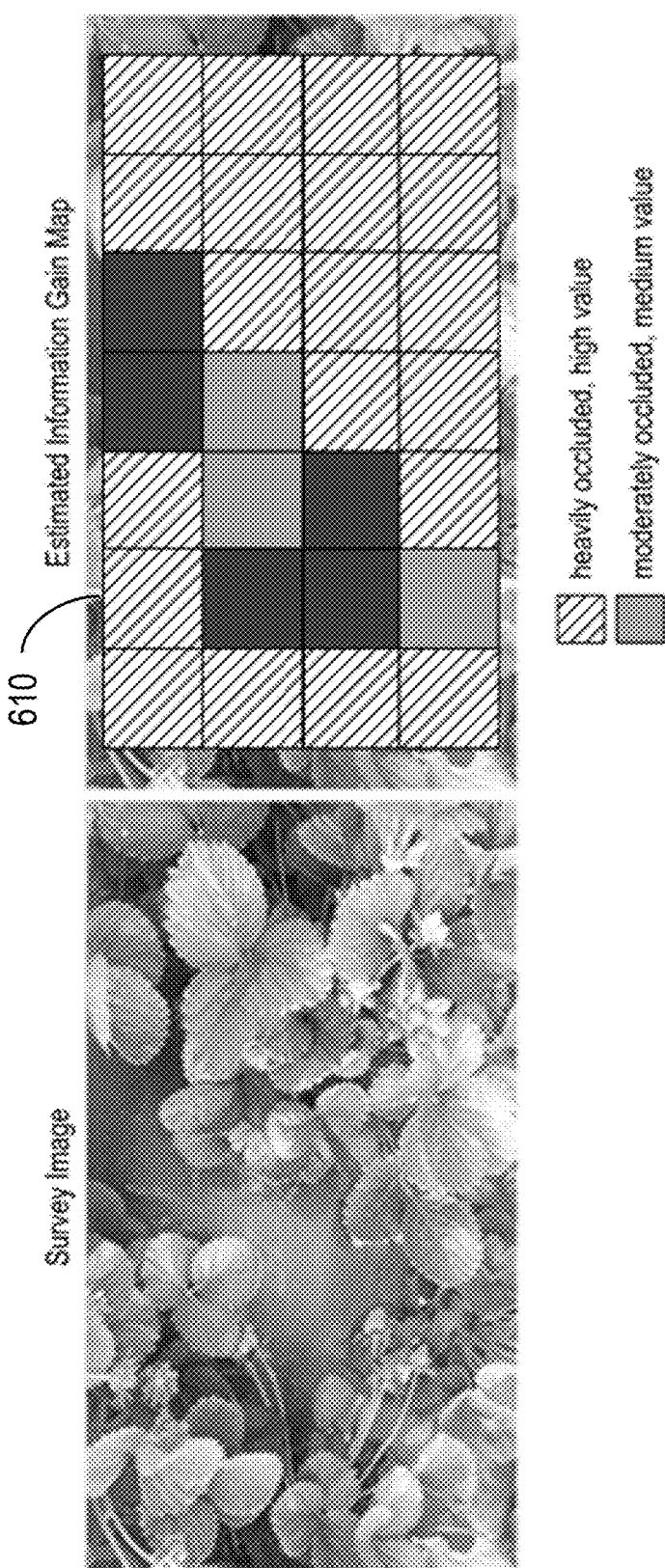
FIG. 6 illustrates an example parametric model according to some example implementations.

In this respect, FIG. 6 illustrates an example parametric model 610 according to some example implementations. High-level planning layer 110*a* may assign values to different cells in the parametric model and identify cells that would be expected to gain more information, such as during exploration of a search space. As illustrated in FIG. 6, a cell of the dynamic occupancy grid corresponding to an unoccluded area of the scene might be assigned a low value. Similarly, a cell of the dynamic occupancy grid corresponding to a moderately occluded area of the scene might be assigned a medium value, and a cell of the dynamic occupancy grid corresponding to a heavily occluded area of the scene might be assigned a high value.

Returning to FIG. 2, at step 210, based on the parametric model, the computing platform 110 may determine a planned trajectory (also referred to herein as "motion plan") of the first robotic manipulator arm over a predetermined number of future time steps. In determining the planned trajectory of the first robotic manipulator arm, the computing platform 110 may identify whether an obstacle will intersect with the planned trajectory of the first robotic manipulator arm within the predetermined number of future time steps (e.g., three or less time steps ahead). This allows for a finite planning horizon, using instant knowledge and understanding of the scene to plan the next movements for each robotic manipulator arm.

In this way, the computing platform 110 may generate one or more commands to cause one or more of the robotic manipulator arms to manipulate a desired object while avoiding a collision with other objects and other robotic manipulator arms that may be present in the environment or workspace. Alternatively, there may be instances where a collision with an obstacles or object within the environment or other robotic manipulator arm may be desired. In such instances, the computing platform 110 may generate one or more commands to cause such a collision.

The planned trajectory of the first robotic manipulator arm may be selected from a set of candidate trajectories for the first robotic manipulator arm. The selection of the planned trajectory can occur as the current task of the first robotic manipulator arm is being completed. Each candidate trajectory of the set of candidate trajectories may include a series of planned states for the first robotic manipulator arm occurring within the predetermined number of future time steps. The candidate trajectories may be pruned (e.g., based on dynamic constraints) and stacked or ranked, which can assist with the selection of the planned trajectory from the candidate trajectories.

At step 212, the computing platform 110 may control the first robotic manipulator arm to execute the planned trajectory according to a first task of the plurality of tasks, such as may have been selected from the candidate trajectories described previously. In some examples, the planned trajectory may include manipulating a first object of the one or more objects to reveal a second object in the real-world environment (e.g., in order to perform a second task of the plurality of tasks on the second object). For example, the second object may be an object that is at least partially occluded or completely occluded by the first object. In an example, the first object may include at least a portion of the second robotic manipulator arm. In some examples, manipulating a first object may include temporarily or permanently volumetrically deforming or displacing (e.g., pushing aside) the first object. In other examples, manipulating the first object may include picking up, tipping, grabbing, pulling, twisting, rifling, or otherwise interacting with or moving the first object. For example, the computing platform 110 may deform the first object in an environment using the first robotic manipulator arm to provide space for the second robotic manipulator arm to view, interact, or otherwise engage with another object(s) in the environment (e.g., improving visibility and reachability of previously occluded areas or objects) while avoiding collisions between the first and second robotic manipulator arms.

Some implementations may include harvesting of crops which may utilize the ability of one or more robotic manipulator arms to manipulate and get through organic matter (e.g., foliage and/or the like) to access the crop (e.g., peppers, blueberries, stone fruit, avocados, leafy greens, and/or the like) or other objects of interest underneath. Additional implementations may include weeding (e.g., moving aside a good plant in order to reach and extract an unwanted plant). Another example might include using a first robotic manipulator arm to move cables aside, thus deforming the one or more cables, and opening space for another robotic manipulator arm, which may interact with another of the one or more cables or perform some other activity.

Additionally, or alternatively, manipulating an object may include holding or placing an object in the environment with one of the robotic manipulator arms and performing a second activity with the object using another of the robotic manipulator arms. For example, in food preparation tasks, a first robotic manipulator arm may perform a holding activity of an object (e.g., hold a food item), and another robotic manipulator arm may manipulate the object in a shared workspace (e.g., chop the food item, shaping dough), without damaging the object that is being manipulating. In another example, in handling construction materials (e.g., installing lumber, laying down concrete, putting down bricks, moving cables, and the like), a first robotic manipulator arm might be used to hold the material steady, and another robotic manipulator arm might be used to screw or performed a specified activity. Such activities may require a first robotic manipulator arm for a first manipulation (e.g., steadying) and a second robotic manipulator arm for performing a second manipulation.

Interactions with the environment described herein increases the number and quality of affordances (e.g., what a scene can offer as a reward) available to the system for subsequent actions. Unknown explorable regions are made visible, uncovering potential rewards. In this regard, FIG. 7 illustrates an example scene before (left) and after (right) interaction with the scene, revealing a cluster of previously occluded strawberries, according to some embodiments disclosed herein.

Scene interaction is afforded by the combination of an end-effector and motion primitives which move it in a useful way. In the aforementioned strawberry picking application, situations are encountered where one robotic manipulator arm needs to interact with foliage to improve the available visibility for the image acquisition system and/or reachability for the "picking" robotic manipulator arm. FIGS. 9-11 depict example classes of non-prehensile motion primitives for interacting with strawberry plants, which are denoted as tipping (FIG. 9), twisting (FIG. 10) and rifling (FIG. 11). These can serve a dual purpose including both making previously occluded areas visible and clearing the path for a pick task to avoid collisions with a plant or robotic manipulator arm. In more detail, FIG. 9 illustrates a first example manipulation primitive 900, which can include pushing an upper portion of the plant (e.g., foliage) aside from the base of the plant with a flat panel end-effector. Pushing the plant to the side opens space for exploring with cameras (middle) and picking (right). FIG. 10 illustrates a second example manipulative primitive 1000 in which a robotic manipulator arm grabs and twists a plant by its stems with a spiral end-effector. FIG. 11 illustrates a third example manipulative primitive 1100 in which a flat panel end-effector is moved at the canopy level by a robotic manipulator arm to help disambiguate individual plants when the centers are occluded by the canopy thereby exposing the centers sequentially.

FIGS. 12-15 depict variants of end-effectors for use with a robotic manipulator arm which may be deployed for foliage manipulation including a waffle grid 1200 (FIG. 12), a solid plate 1300 (FIG. 13), a hook and corkscrew 1400 (FIG. 14) and a rake with joined tines 1500 (FIG. 15).

Accordingly, in some implementations, a descriptive library of types of motions to be chosen from for resulting end-effector manipulation can be created as implementable functions that are stored on the codebase and are available to be requested by higher-level planning modules. Interaction with the scene can increase the number and quality of affordances (e.g., what the scene can offer as reward) available to the system for subsequent actions.

Returning to FIG. 2, at step 214, the computing platform 110 may update the parametric model of the real-world environment associated with the plurality of tasks. For example, the updating may occur at every time step in case of a changing scene. Dynamically updating the parametric model of the real-world environment associated with the plurality of tasks may include determining a planned trajectory of the second robotic manipulator arm over a predetermined number of future time steps. In some examples, the parametric model of the real-world environment associated with the plurality of tasks may be updated to include additional objects identified by an image sensor on the robotic device and parameterized into a finite set of model parameters.

That is, during the execution of the planned trajectory, the computing platform 110 may dynamically plan and adapt its behavior, triggered by changes in the environment which are monitored in real-time. For example, the discovery of a new object during a maneuver of a robotic manipulator arm to push a first object aside (e.g., discovery of new strawberries during a maneuver to push foliage aside), can trigger another robotic manipulator arm to move and manipulate the newly discovered object (e.g., pick the strawberries) or, if the new object is still partially occluded (e.g., strawberries are still obstructed by foliage), the other robotic manipulator arm may modify its configuration until a desired task can be executed on the newly discovered object (e.g., until the strawberry can be picked).

At step 216, the computing platform 110 may control, based on the updated parametric model, the second robotic manipulator arm to perform a second task of the plurality of tasks on the second object in coordination with the first task, working in overlapping workspaces. The controlling of the robotic manipulator arms can be automatic and occurs without user interaction. Advantageously, the parametric model of the real-world environment associated with the plurality of tasks may be cyclically updated in a round-robin manner for each additional robotic manipulator arm used for performing one of the plurality of tasks. Because a simplified model is used, rather than live raw data, the computing platform 110 can be configured to process information quickly to allow path planning on robotic manipulator arms (at "N" degrees of freedom), one arm at a time, in such a round-robin manner. This allows for a fast refresh rate without planning for large number of dimensions. Additionally, because coordination is defined at a task level instead of a motion planning level, it is possible to plan for both arms separately. This decentralization can enable the use of multiple manipulator arms without increasing planning time.

In some embodiments, if the computing platform 110 reaches a local minima or a situation in which the system is not able to plan, the system may request a different plan, or escalate the planning to a next higher level (e.g., to a high-level planning layer 110*a*). High-level planning layer 110*a* may identify the problem and trigger fallback or recovery behaviors (e.g., immediately use a secondary plan that is available).

Figure 3:
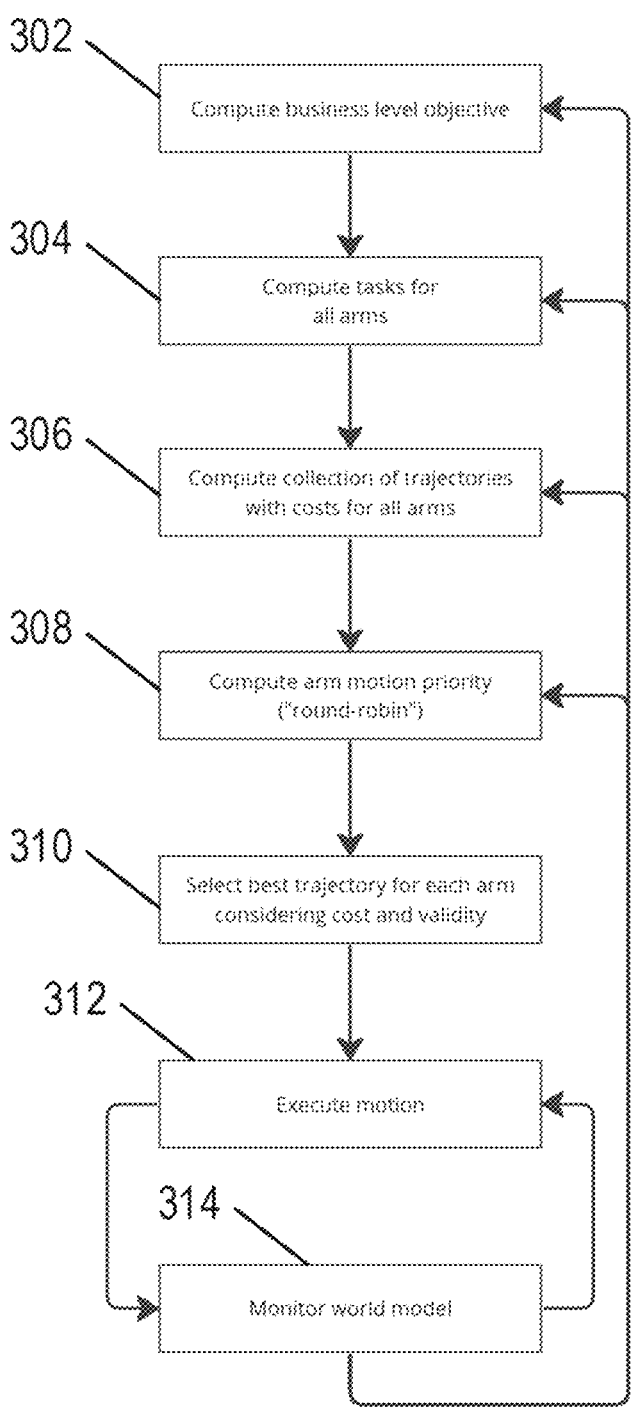
FIG. 3 is a flow diagram illustrating an example embodiment of a computation process for dynamic coordination of multiple robotic manipulator arms in accordance with some example embodiments.
Figure 4:
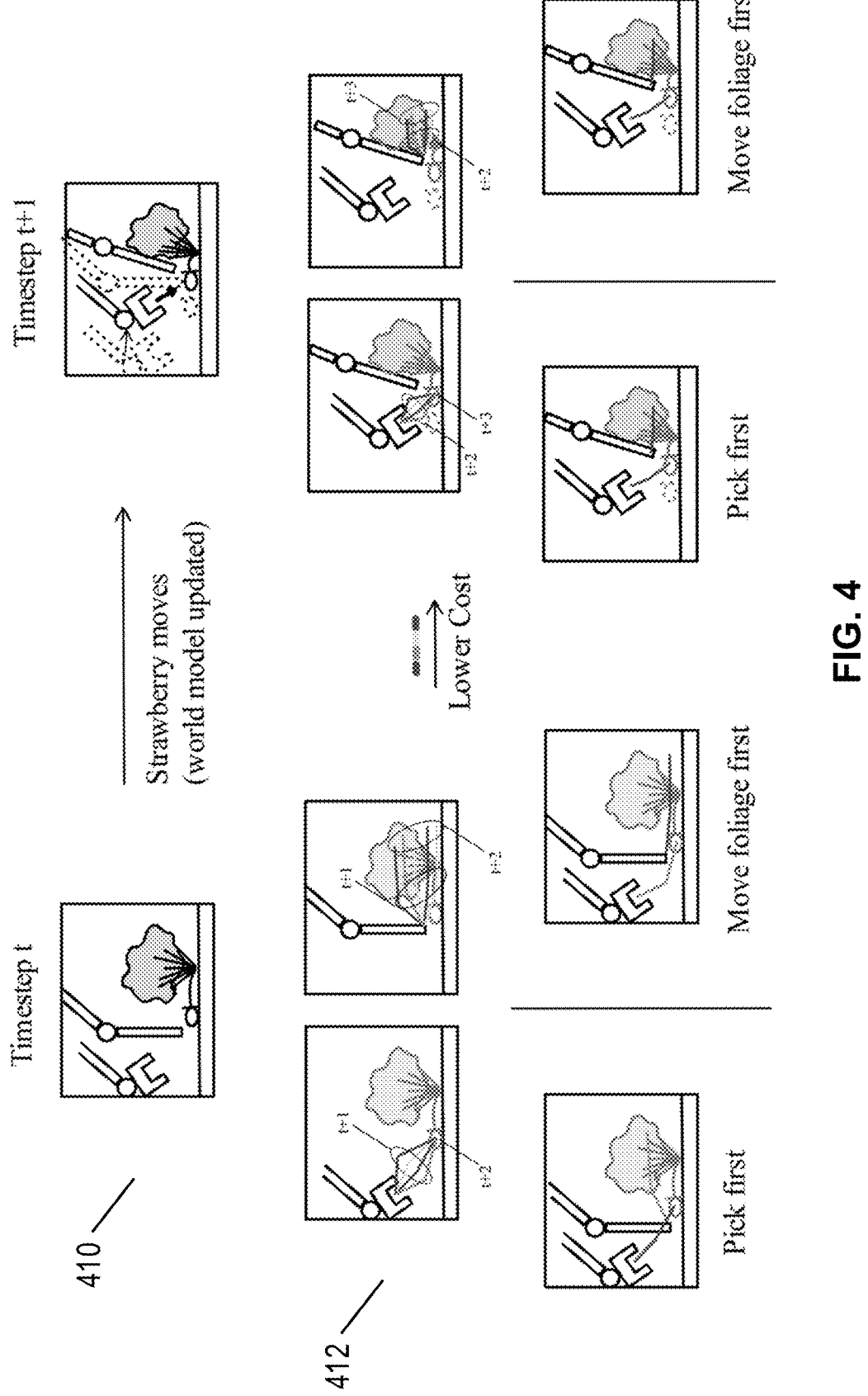
FIG. 4 is a block diagram illustrating an example embodiment of a computation process for dynamic coordination of multiple robotic manipulator arms in accordance with some example embodiments.

FIGS. 3-4 illustrates example embodiments of a computation process for dynamic coordination of multiple robotic manipulator arms at each time step.

Referring to FIG. 3, at step 302, the computing platform 110 may compute various objectives (e.g., business-level objectives) for multiple robotic manipulator arms. At step 304, the computing platform 110 may assign a separate task to each robotic manipulator arm. For example, one robotic manipulator arm may be tasked with picking a fruit observed in a scene (the picking arm), while another robotic manipulator arm may be tasked with moving foliage aside to open space for the picking arm. Tasks may include sequences that are transcribed into various types of motion. For example, a motion plan for the one robotic manipulator arm might include moving from its current position to the target fruit, and a motion plan for another robotic manipulator arm might include moving parallel to the ground and moving aside foliage.

At step 306, the computing platform 110 may compute a collection or set of trajectories with associated costs for each robotic manipulator arm. For example, referring to FIG. 4, at 410, each robotic manipulator arm may plan a set of trajectories from a current time step (t) over a time window into the future (t, t+1, t+2), considering a quasi-static scene. At 412, costs related to a particular task can be assigned to each trajectory. For example, the next two time steps may be computed and different trajectories may be identified based on a corresponding cost.

Returning to FIG. 3, at step 308, the computing platform 110 may compute arm motion priority based on a prioritization mechanism (e.g. "round-robin"). At step 310, the best trajectory (e.g., most promising regions to explore to reach a target objective) may be selected for each robotic manipulator arm considering cost and validity. For example, if the first robotic manipulator arm is chosen to select a trajectory to execute first, it selects the best trajectory for its objective, and the selected trajectory is invalidated for the second robotic manipulator arm. Conversely, if the second robotic manipulator arm is chosen to select a trajectory to execute first, it selects the best trajectory for its objective, and the selected trajectory is invalidated for the first robotic manipulator arm. In both instances, the selected trajectory that is invalidated may force either one of the robotic manipulator arms to select a suboptimal trajectory that is still practicable for a performing task.

At step 312, the trajectories (also referred to as "motion plans") are sent to the execution level (e.g., execution layer 110*d*), which causes the motions for each of the robotic manipulator arms to be executed. At step 314, the state of the world is monitored while the motions are being executed. If anything changes in the world model that prompts a change, a signal is sent to any of the prior blocks (302-310) so that appropriate measures may be taken. For example, as foliage is pushed aside, a position and orientation of a target fruit may change. While the overall objective and the specific tasks assigned to each robotic manipulator arm might not need to be changed (picking arm still needs to pick and paddle arm still needs to push the foliage aside), the set of trajectories can be recalculated, and aspects of the disclosure allows for such replanning for the one or more robotic manipulator arms. In this respect, time step t+1 in FIG. 4 shows the process being repeated and the trajectories being planned for future time steps (t+1, t+2, t+3) and selected based on which arm has priority.

Some implementations of the current subject matter can enable an automated system with human-like behaviors of interacting with the environment. Some implementations of the current subject matter can enable one or more of: mimic human-like motions without a human in the loop, allow for multiple robotic manipulator arms to collaborate on tasks in a shared workspace where their coordination is essential to task success, does not limit each actor (e.g., manipulator arm) to manipulating a common object but in doing so each actor can also improve the quality of scene understanding, and allow for independent movement in each manipulator arm to achieve a higher-level objective. For example, FIG. 16 illustrates how some implementations of the current subject matter can allow for dynamic replanning 1600 caused by unpredictable changes in the scene. For instance, as foliage is pushed aside, a position and orientation of the strawberry may change along with displacement of the foliage. Computing platform 110 may accommodate for this change by replanning for one or more robotic manipulator arms.

In some embodiments, the computing platform 110 can have its high-level objectives for the robot set by an expert user. For example, the expert user may decide a threshold for when to pick a fruit, as environmental conditions can force different aspects to be prioritized. For instance, if rain is forecasted, the expert user may lower a ripeness threshold for fruits that are to be picked. In another example, the expert user may adjust for specific needs, such as specifying a target area for fruit picking while avoiding other areas.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. For example, the logic flows may include different and/or additional operations than shown without departing from the scope of the present disclosure. One or more operations of the logic flows may be repeated and/or omitted without departing from the scope of the present disclosure. Other implementations may be within the scope of the following claims.

What is claimed is:

1. A method comprising:

acquiring, from a perspective of a robotic device, image data of a real-world environment associated with a plurality of tasks to be performed in coordination by at least a first robotic manipulator arm and a second robotic manipulator arm of the robotic device;

identifying one or more objects in the image data;

generating one or more parametric representations of the one or more objects in the image data;

generating, using the one or more parametric representations, a parametric model of the real-world environment associated with the plurality of tasks, wherein the parametric model includes a three-dimensional volumetric grid composed of voxels, and wherein each voxel is assigned with a low-dimensional representation of a state of a portion of the real-world environment and semantic information associated with the one or more objects;

based on the parametric model, determining a planned trajectory of the first robotic manipulator arm over a predetermined number of time steps, including identifying whether an obstacle will intersect with the planned trajectory of the first robotic manipulator arm within the predetermined number of time steps;

controlling the first robotic manipulator arm to execute the planned trajectory according to a first task of the plurality of tasks including manipulating a first object of the one or more objects to reveal a second object in the real-world environment;

dynamically updating the parametric model of the real-world environment associated with the plurality of tasks; and controlling, based on the updated parametric model, the second robotic manipulator arm to perform a second task of the plurality of tasks on the second object, wherein the second task is performed in coordination with the first task.

2. The method of claim 1, wherein dynamically updating the parametric model associated with the plurality of tasks comprises determining a planned trajectory of the second robotic manipulator arm over a predetermined number of time steps.

3. The method of claim 1, wherein parameterizing the image data comprises transforming pixel data of the one or more objects into compressed representations of the one or more objects.

4. The method of claim 1, wherein the second object is an object that is at least partially occluded by the first object.

5. The method of claim 1, wherein the first object comprises at least a portion of the second robotic manipulator arm.

6. The method of claim 1, wherein the image data is acquired using an image sensor on the robotic device.

7. The method of claim 1, wherein dynamically updating the parametric model of the real-world environment associated with the plurality of tasks comprises updating to include additional objects identified by an image sensor on the robotic device and parameterized.

8. The method of claim 1, wherein manipulating the first object of the one or more objects comprises volumetrically deforming or displacing the first object.

9. The method of claim 1, wherein the predetermined number of time steps is three or less future time steps.

10. The method of claim 1, wherein the planned trajectory of the first robotic manipulator arm is selected from a set of candidate trajectories for the first robotic manipulator arm, wherein each candidate trajectory of the set of candidate trajectories comprises a series of planned states for the first robotic manipulator arm occurring within the predetermined number of time steps.

11. The method of claim 1, wherein dynamically updating the parametric model of the real-world environment associated with the plurality of tasks comprises cyclically updating in a round-robin manner for each additional robotic manipulator arm used for performing one of the plurality of tasks.

12. The method of claim 1, wherein the first robotic manipulator arm comprises an end-effector operatively coupled to a distal end of the first robotic manipulator arm for performing the first task on the first object.

13. The method of claim 12, wherein the end-effector comprises a flexible paddle.

14. The method of claim 1, wherein the second robotic manipulator arm comprises an end-effector operatively coupled to a distal end of the second robotic manipulator arm for performing the second task on the second object.

15. The method of claim 14, wherein the end-effector comprises an object grasper.

16. The method of claim 1, wherein the real-world environment is an outdoor environment.

17. The method of claim 1, wherein the controlling of the first robotic manipulator arm and the controlling of the second robotic manipulator arm occur without user interaction.

18. A non-transitory computer-readable medium on which is stored instructions for controlling a robotic device, which, when executed, cause a processor to perform operations comprising:

acquiring, from a perspective of a robotic device, image data of a real-world environment associated with a plurality of tasks to be performed in coordination by at least a first robotic manipulator arm and a second robotic manipulator arm of the robotic device;

identifying one or more objects in the image data;

generating one or more parametric representations of the one or more objects in the image data;

generating, using the one or more parametric representations, a parametric model of the real-world environment associated with the plurality of tasks, wherein the parametric model includes a three-dimensional volumetric grid composed of voxels, and wherein each voxel is assigned with a low-dimensional representation of a state of a portion of the real-world environment and semantic information associated with the one or more objects;

based on the parametric model, determining a planned trajectory of the first robotic manipulator arm over a predetermined number of time steps, including identifying whether an obstacle will intersect with the planned trajectory of the first robotic manipulator arm within the predetermined number of time steps;

controlling the first robotic manipulator arm to execute the planned trajectory according to a first task of the plurality of tasks including manipulating a first object of the one or more objects to reveal a second object in the real-world environment;

dynamically updating the parametric model of the real-world environment associated with the plurality of tasks; and controlling, based on the updated parametric model, the second robotic manipulator arm to perform a second task of the plurality of tasks on the second object, wherein the second task is performed in coordination with the first task.

19. An apparatus comprising:

a plurality of robotic manipulator arms;

one or more image sensors;

a processor; and a memory storing instructions, which when executed by the processor, result in operations comprising:

acquiring, from the one or more image sensors, image data of a real-world environment associated with a plurality of tasks to be performed in coordination by at least a first robotic manipulator arm and a second robotic manipulator arm of the plurality of robotic manipulator arms;

identifying one or more objects in the image data;

generating one or more parametric representations of the one or more objects in the image data;

generating, using the one or more parametric representations, a parametric model of the real-world environment associated with the plurality of tasks, wherein the parametric model includes a three-dimensional volumetric grid composed of voxels, and wherein each voxel is assigned with a low-dimensional representation of a state of a portion of the real-world environment and semantic information associated with the one or more objects;

based on the parametric model, determining a planned trajectory of the first robotic manipulator arm over a predetermined number of time steps, including identifying whether an obstacle will intersect with the planned trajectory of the first robotic manipulator arm within the predetermined number of time steps;

controlling the first robotic manipulator arm to execute the planned trajectory according to a first task of the plurality of tasks including manipulating a first object of the one or more objects to reveal a second object in the real-world environment;

US 12,564,957 B2

19 dynamically updating the parametric model of the
real-world environment associated with the plurality
of tasks; and controlling, based on the updated parametric model, the
second robotic manipulator arm to perform a second
task of the plurality of tasks on the second object,
wherein the second task is performed in coordination
with the first task.

20. The apparatus of claim 19, wherein dynamically
updating the parametric model associated with the plurality
of tasks comprises determining a planned trajectory of the
second robotic manipulator arm over a predetermined num-
ber of time steps.

* * * * *

20